(12) United States Patent
Oshida

(10) Patent No.: US 8,028,190 B2
(45) Date of Patent: Sep. 27, 2011

(54) COMPUTER SYSTEM AND BUS CONTROL DEVICE

(75) Inventor: Hiroaki Oshida, Tokyo (JP)

(73) Assignee: NEC Corporation, Tokyo (JP)

( * ) Notice: Subject to any disclaimer, the term of this patent is extended or adjusted under 35 U.S.C. 154(b) by 257 days.

(21) Appl. No.: 12/402,960

(22) Filed: Mar. 12, 2009

(65) Prior Publication Data

US 2009/0235123 A1   Sep. 17, 2009

(30) Foreign Application Priority Data

Mar. 14, 2008   (JP) .................. 2008-066831

(51) Int. Cl.
    *G06F 11/00*   (2006.01)
(52) U.S. Cl. .................................... 714/5.11
(58) Field of Classification Search ............ 714/5, 43, 714/5.1, 5.11, 15
    See application file for complete search history.

(56) References Cited

U.S. PATENT DOCUMENTS

| 6,393,558 B1 * | 5/2002 | Kim ................ 713/1 |
| 7,631,226 B2 * | 12/2009 | Oohira .............. 714/43 |
| 2002/0184576 A1 * | 12/2002 | Arndt et al. ........ 714/48 |
| 2004/0003160 A1 * | 1/2004 | Lee et al. .......... 710/305 |

FOREIGN PATENT DOCUMENTS

JP      2005215809 A    8/2005

* cited by examiner

*Primary Examiner* — Scott Baderman
*Assistant Examiner* — Yair Leibovich

(57) ABSTRACT

The bus control device includes a reset control unit which resets the input and output bus in response to receipt of reset instruction; a reset inhibition unit which inhibits a reset of the input and output bus triggered by a fault occurrence in the input and output bus; a log collection unit which collects log information of an input and output device connected to a fault occurrence section in the input and output bus triggered by the fault occurrence in the input and output bus; and an input and output interface which transfers the log information collected by the log collection unit to the processor. The reset inhibition unit cancels inhibition of the reset after the collection of the log information by the log collection unit has been completed.

18 Claims, 10 Drawing Sheets

COMPUTER SYSTEM AND BUS CONTROL DEVICE

This application is based on and claims the benefit of the priority of Japanese patent application NO. 2008-066831, filed on Mar. 14, 2008, the content of which is incorporated hereinto by reference.

BACKGROUND

1. Technical Field

The present invention relates to a bus control technique which performs a recovery process from a fault in an input and output bus.

2. Related Art

The PCI (Peripheral Component Interconnect) standard has been widely applied as the standard for buses serving as signal transmission paths in computer systems. In known computer systems, in the case where an error not otherwise specified of a transaction (for example, address parity error) in which a fault has occurred in a PCI bus is detected during access from a central processing unit (CPU) in the computer system to PCI devices (input and output devices electrically connected to the PCI bus), or, during access from the PCI devices to a memory in the computer system, a system error signal line becomes active. As described above, when the system error signal line is asserted, an error occurrence is notified to the CPU (or OS: operating system) via a signal line for NMI (Non Mask Interrupt). This notification can make the CPU know the occurrence of the error. However, the CPU cannot specify the source of the aforementioned error occurrence; therefore, an appropriate error process cannot be executed. Therefore, the CPU abnormally aborts the system (brings the system down) at a time of the occurrence of NMI in order to inhibit error propagation.

On the other hand, a fault such as a data parity error which enables to specify a transaction in which a fault has occurred in the PCI bus is reported to the CPU as an error reply. With respect to this fault, an exception handler of the OS performs a special error process.

However, specifications and control methods of PCI devices to be connected are largely different depending on the PCI devices; therefore, the exception handler of the OS cannot perform error processes of all the PCI devices by itself completely. Therefore, in the case where the appropriate error process cannot be performed, the exception handler makes the system abort (brings the system down) abnormally in order to inhibit the propagation of the aforementioned error.

A related art capable of avoiding abnormal stop of the system as described above is disclosed in Japanese Laid-open patent publication NO. 2005-215809, for example. A computer system disclosed in Japanese Laid-open patent publication NO. 2005-215809 has a PCI bus controller, a bridge driver (program for PCI bus fault control), and a device driver. The PCI bus controller includes a bus fault indicator (ERI) which lights when an error is detected in a PCI bus. At a time of lighting the bus fault indicator, the PCI bus controller makes the PCI bus transit to a degeneracy state (that is, a use of a part of the PCI bus is stopped). The bridge driver has a function of detecting a fault of the PCI bus by monitoring the degeneracy state of the PCI bus controller (PBC) and notifying a fault occurrence to a corresponding device driver at a time of the occurrence of an error of the PCI bus. Furthermore, the bridge driver has a function of issuing instruction which is for recovering the PCI bus to the PCI bus controller, and then notifying the device driver that the recovery has been completed. When the device driver receives recovery completion notification, the device driver executes an initial setting process for the PCI device and incorporates the PCI device in the computer system again.

In the technique as disclosed in Japanese Laid-open patent publication NO. 2005-215809, the fault of the PCI bus is not notified to the exception handler of the CPU and OS; the bridge driver and the device driver work together to detect the fault of the PCI bus without occurrence of the system down, and perform the recovery.

SUMMARY

In the technique disclosed in Japanese Laid-open patent publication NO. 2005-215809, when the fault of the PCI bus is detected, the PCI bus is made to transit to the degeneracy state by using the bus fault indicator in order to block the PCI bus that becomes a fault section from the system. However, the PCI bus is blocked from the system in response to the detection; therefore, various kinds of detailed log information on the fault occurrence section (for example, information obtained from a part of an inside chipset and related to control of a bus in which a fault has occurred and information in which a PCI card mounted in a subordinate of the bus in which the fault has occurred holds) cannot be collected. Therefore, a problem in fault factorial analysis (unfolding of the fault) of an interface including the PCI bus occurs. More particularly, register information of the PCI card necessary for fault factorial analysis cannot be collected.

Furthermore, for recovering from the fault of the PCI bus, a reset of the PCI bus is executed by the bridge driver; and a reset of the PCI card arranged in the chipset inside and in a subordinate of the PCI bus is further executed. Consequently, tho bus fault indicator is reset. Therefore, when various processes operated by the computer system issue a transaction for the PCI bus to be reset during the reset of the PCI bus, the transaction is lost and there is a possibility of causing a severe fault such as a system stall or a system down.

The present invention has been made in view of the above-mention, and an object of the present invention is to provide a computer system and a method for controlling a bus, both of which can surely collect log information on a fault at a time of recovering from the fault of an input and output bus such as a PCI bus. Furthermore, another object of the present invention is to provide a computer system and a method for controlling a bus, both of which can safely reset an input and output bus at a time of recovering from a fault of an input and output bus such as a PCI bus.

In one embodiment, there is provided a computer system including: a processor which performs data processing; an input and output bus to which at least one input and output device is connected; and a bus control device which is intervened between the processor and the input and output bus, and performs control of the operation of the input and output bus. The bus control device includes: a reset control unit which resets the input and output bus in response to receipt of reset instruction; a reset inhibition unit which inhibits a reset of the input and output bus triggered by a fault occurrence in the input and output bus; a log collection unit which collects log information of an input and output device connected to a fault occurrence section in the input and output bus triggered by the fault occurrence in the input and output bus; and an input and output interface which transfers the log information collected by the log collection unit to the processor. The reset inhibition unit cancels inhibition of the reset after the collection of the log information by the log collection unit has been completed.

Furthermore, in another embodiment, there is provided a bus control device which intervenes between a processor which performs data processing and an input and output bus to which at least one input and output device is connected, and performs control of the operation of the input and output bus. The bus control device includes: a reset control unit which resets the input and output bus in response to receipt of reset instruction; a reset inhibition unit which inhibits a reset of the input and output bus triggered by a fault occurrence in the input and output bus; a log collection unit which collects log information of an input and output device connected to a fault occurrence section in the input and output bus triggered by the fault occurrence in the input and output bus; and an input and output interface which transfers the log information collected by the log collection unit to the processor. The reset inhibition unit cancels inhibition of the reset after the collection of the log information by the log collection unit has been completed.

It is preferable that the bus control device further includes a bus fault indicator which makes the input and output bus transit to a degeneracy state triggered by the fault occurrence in the input and output bus; and the bus fault indicator cancels the degeneracy state of the input and output bus after the reset of the input and output bus by the reset control unit has been completed. In this case, it is preferable that the processor has a bridge driver which instructs transition to the degeneracy state of the input and output bus to the bus fault indicator triggered by the fault occurrence in the input and output bus; and the bridge driver instructs cancellation of the degeneracy state of the input and output bus to the bus fault indicator after the reset of the input and output bus by the reset control unit has been completed.

As described above, a computer system and a bus control device according to the present invention collect log information of an input and output device connected to a fault occurrence section in an input and output bus in a state where a reset of the input and output bus is inhibited triggered by a fault occurrence in the input and output bus; and then, inhibition of the reset of the input and output bus is canceled after collection of the log information has been completed. This enables collection of log information of the input and output bus related to the fault in the input and output bus before the reset of the input and output bus is started; therefore, a processor on the computer system can surely obtain log information necessary for fault factorial analysis.

Furthermore, in the case where the bus control device has the bus fault indicator and the processor has the bridge driver, the processor can prevent a transaction to the input and output bus from being accidentally issued during the reset of the input and output bus; therefore, a severe fault such as a transaction lost occurrence due to competition of the reset and the transaction of the input and output bus can be avoided. This makes it possible to safely recover the input and output bus from the fault.

BRIEF DESCRIPTION OF THE DRAWINGS

The above and other objects, advantages and features of the present invention will be more apparent from the following description of certain exemplary embodiments taken in conjunction with the accompanying drawings, in which.

DETAILED DESCRIPTION

Various exemplary embodiments according to the invention will be now described herein with reference to drawings. Those skilled in the art will recognize that many alternative embodiments can be accomplished using the teachings of the present invention and that the invention is not limited to the embodiments illustrated explanatory purposed.

First Exemplary Embodiment

Figure 1:
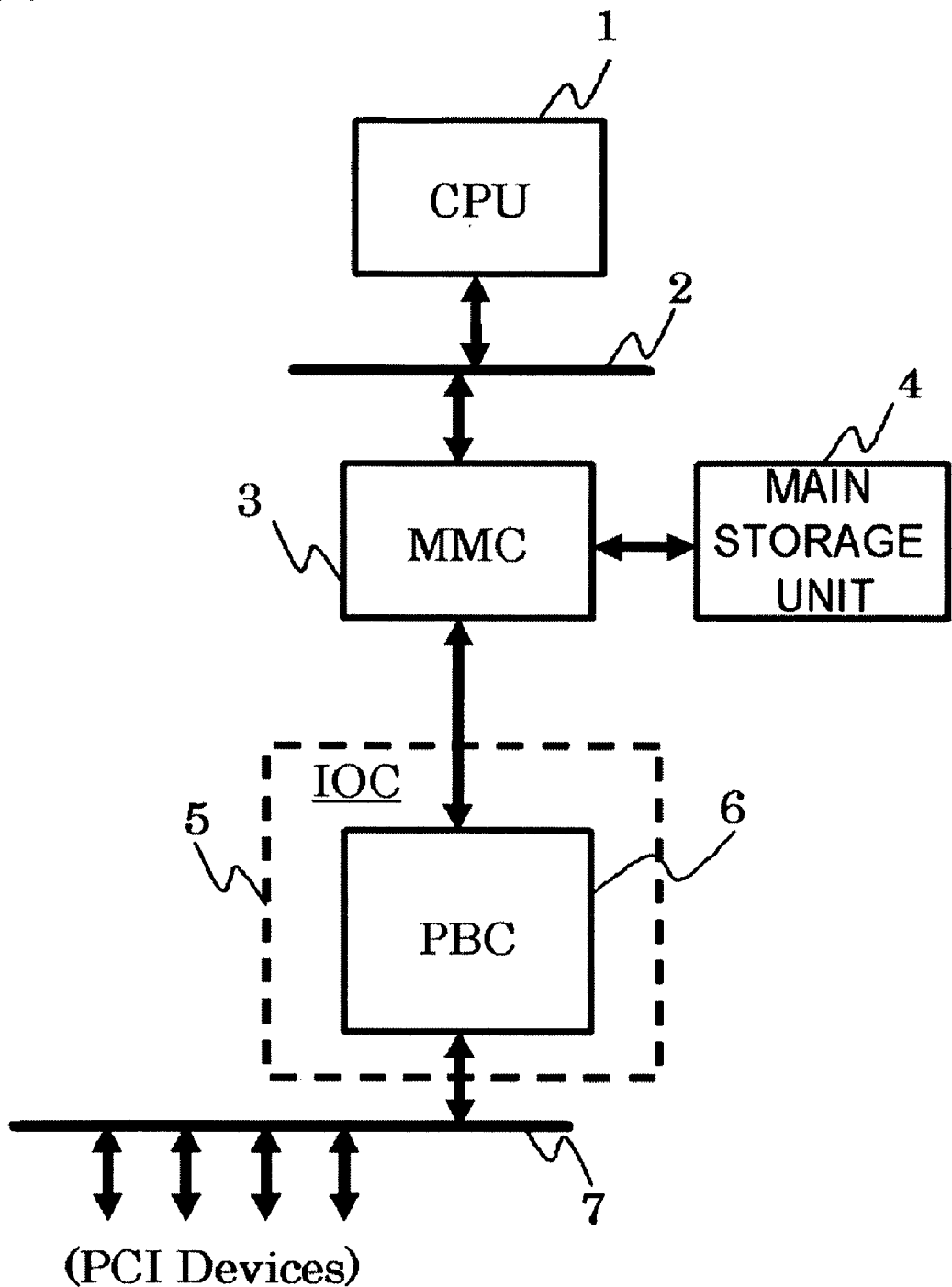
FIG. 1 is a block diagram showing a schematic configuration of a computer system of a first exemplary embodiment according to the present invention.

FIG. 1 is a block diagram showing a schematic configuration of a computer system of a first exemplary embodiment according to the present invention. The computer system has a processor (CPU) 1, a processor bus (FSB: Front Side Bus) 2, a memory controller (MMC: Main Memory Control) 3, a main storage unit 4, and an I/O controller (IOC) 5. The processor 1 is connected to the memory controller 3 via the processor bus 2. The I/O controller 5 incorporates a PCI bus controller (PBC) 6, that is, a bus control device connected to a PCI bus (input and output bus) 7. The processor 1 has a function of executing data processing. At least one PCI device (PCI Device) is electrically connected to the PCI bus 7. The PCI bus controller 6 intervenes between the processor 1 and the PCI bus 7 and has a function of performing control of the operation of the PCI bus 7.

The memory controller 3 has an interface function with the processor 1, the main storage unit 4, and the I/O controller (IOC) 5. The memory controller 3 is a unit which performs routing of transactions received from the processor 1 and the I/O controller 5 and is constituted by one or a plurality of large scale integrated circuits (LSI) depending on system scale and configuration. The I/O controller 5 has an interface function with the MMC 3. The I/O controller 5 is a unit which incorporates the PCI bus controller 6 that performs control of the PCI bus 7 connected in a subordinate of the I/O controller 5 and is constituted by one or a plurality of LSIs depending on system scale and configuration. It is possible to connect one or a plurality of PCI devices (peripherals) to the PCI bus 7.

Figure 2:
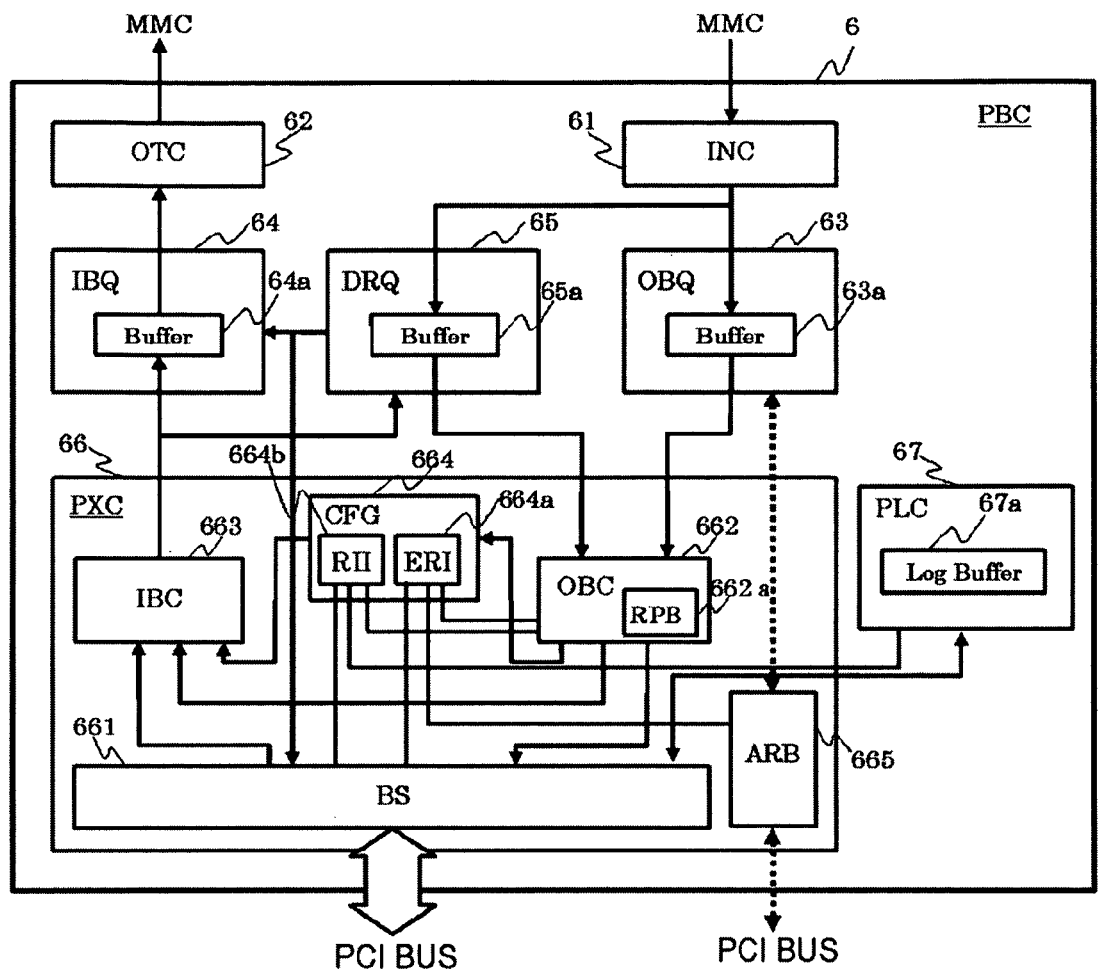
FIG. 2 is a block diagram showing a schematic configuration of a PCI bus controller (PBC) of the first exemplary embodiment.

FIG. 2 is a block diagram showing a schematic configuration of the PCI bus controller (PBC) 6 of the first exemplary embodiment. The PCI bus controller 6 includes an input interface control unit (INC) 61, an output interface control unit (OTC) 62, an outbound buffer control unit (OBQ) 63, an inbound buffer control unit (IBQ) 64, an inbound read data control unit (DRQ) 65, a PCI bus control unit (PXC) 66, and a log collection unit (PLC) 67.

The PCI bus control unit 66 includes a bus signal control unit (BS) 661, an outbound control unit (OBC) 662, an inbound control unit (IBC) 663, a configuration unit (CFG) 664, and an arbitration unit (ARB) 665.

The input interface control unit 61 has a control function of receiving the transaction from the memory controller 3 and performing routing to a store destination in the PCI bus controller 6 in response to the type of the transaction. The output interface control unit 62 has an interface function with the inbound buffer control unit 64 to be described later, and has a control function of sending out the transaction from the inbound buffer control unit 64 to the memory controller 3.

The outbound buffer control unit (OBQ) 63 has an interface function with the input interface control unit 61; an interface function with the buffer (Buffer) 63a which receives an outbound request transaction from the input interface control unit 61 and stores the received transaction, and the arbitration unit (ARB) 665 to be described later; and an interface function with the PCI bus control unit (PXC) 66 to be described later. The outbound buffer control unit 63 has a control function of issuing a PCI bus use request to the arbitration unit 665 when the transaction is stored, and sending the transaction stored in the buffer 63a to the PCI bus control unit 66 when a PCI bus use permission is granted by the arbitration unit 665.

The inbound buffer control unit (IBQ) 64 has an interface function with the PCI bus control unit (PXC) 66 to be described later, and receives an outbound reply transaction and an inbound write request transaction from the PCI bus control unit 66. Furthermore, the inbound buffer control unit 64 has an interface function with the inbound read data control unit (DRQ) 65 to be described later, and receives an inbound read request transaction from the inbound read data control unit 65. The inbound buffer control unit 64 has a buffer 64a which stores the received respective transactions. Besides, the inbound buffer control unit 64 has an interface function with the output interface control unit 62, and has a control function of sending the received transactions to the output interface control unit 62.

The inbound read data control unit (DRQ) 65 has an interface function with the input interface control unit 61, and has a buffer 65a which receives an inbound read reply transaction (read data from the main storage unit 4) from the input interface control unit 61 and stores the received transaction. Furthermore, the inbound read data control unit (DRQ) 65 has an interface function with the PCI bus control unit (PXC) 66 to be described later; and a function of receiving an inbound read request transaction from the PCI bus control unit 66 and checking whether or not data requested by the transaction is present in the buffer 65a. Besides, the inbound read data control unit (DRQ) 65 has a control function of sending the inbound read request transaction to the inbound buffer control unit 64 and issuing retry instruction to the PCI bus control unit 66 at the same time, if the data is not present; and has a control function of reading out the data from the buffer 65a and sending to the PCI bus control unit 66, if the data is present.

The PCI bus control unit (PXC) 66 is configured by the bus signal control unit (BS) 661, the outbound control unit (OBC) 662, the inbound control unit (IBC) 663, the configuration unit (CFG) 664, and the arbitration unit 665, those of which are to be described later; and has a transaction control function of the PCI device.

The bus signal control unit 661 has an interface function with the outbound control unit 662 and the inbound control unit (IBC) 663, those of which are to be described later, and the PCI bus 7; a transaction control function with the PCI devices connected on the PCI bus 7 in accordance with a PCI bus protocol; and a function of setting a bus fault indicator (ERI) 664a and a bus reset inhibition indicator (RII) 664b, those of which are to be described later, at a time of detecting a bus fault. Furthermore, the bus signal control unit 661 has an interface function with the inbound read data control unit 65, and has a function of receiving a retry instruction request to the PCI devices.

The outbound control unit (OBC) 662 has an interface function with the outbound buffer control unit 63, the inbound read data control unit 65, and the bus signal control unit 661, and additionally with the inbound control unit (IBC) 663 and the configuration unit 664, those of which are to be described later; and has a function of performing routing of transactions received from the outbound buffer control unit 63 or the inbound read data control unit 65 to the bus signal control unit 661, the inbound control unit 663, and the configuration unit 664. A routing destination is determined by a transaction type and a lighting state of the bus fault indicator 664a. A configuration request transaction, to be sent to the PCI bus controller 6, received from the outbound buffer control unit 63 is sent to the configuration unit 664; and the inbound read reply transaction received from the inbound read data control unit 65 is sent to the bus signal control unit 661.

The outbound request transaction received from the outbound buffer control unit 63 is sent to the bus signal control unit 661 in the case where the bus fault indicator 664a is not lighted (normal state). In the case where the bus fault indicator 664a is lighted (degeneracy state), as for an outbound read request transaction, a normal read reply transaction in which read data is set to ALL "1" (values of all bits are set to "1") is sent to the inbound control unit 663; as for an outbound deferred write request transaction, a normal write reply transaction is sent to the inbound control unit 663; and as for an outbound posted write request transaction, abrogation is made in the outbound control unit 662. In addition, "lighting" shown in this specification means that a setting value in which an indicator serving as a register corresponds to the lighting state is held.

The outbound control unit 662 has a bus reset instruction holding unit (RPB) 662a, and determines whether or not the configuration request transaction, to be sent to the PCI bus con roller 6, received from the outbound buffer control unit 63 is reset instruction of the PCI bus 7; and in the case where the configuration request transaction is the reset instruction of the PCI bus 7 and the bus reset inhibition indicator 664b is in a lighting state, the reset instruction is kept (held) in the bus reset instruction holding unit 662a. The bus reset instruction holding unit 662a has a function of controlling so as to restart the kept (held) bus reset instruction triggered by a reset of the bus reset inhibition indicator 664b.

The inbound control unit (IBC) 663 has an interface function with the inbound buffer control unit 64, the inbound read data control unit 65, the bus signal control unit 661, the outbound control unit 662, and the configuration unit 664 to be described later, and has a function of performing routing of transactions received from the bus signal control unit 661, the outbound control unit 662, and the configuration unit 664 to the inbound buffer control unit 64 or the inbound read data control unit 65. Routing destinations are determined depending on transaction types. A configuration reply transaction received from tho configuration unit 664, outbound reply transactions received from the bus signal control unit 661 and the outbound control unit 662, and an inbound write request transaction received from the bus signal control unit 661 are sent to the inbound buffer control unit 64. An inbound read request transaction received from the bus signal control unit 661 is sent to the inbound read data control unit 65.

The configuration unit 664 has various kinds of configuration registers, and as a part thereof, has the bus fault indicator 664a which holds that a PCI bus a fault has occurred and the bus reset inhibition indicator 664b which shows that a bus reset cannot be executed at present because the log collection unit 67 to be described later collects log information. Furthermore, the configuration unit 664 has an interface function with the outbound control unit 662 and the inbound control unit 663; updates a configuration register in accordance with instruction of the request transaction received from the outbound control unit 662; and sends the reply transaction to the inbound control unit 663 as needed. The bus fault indicator 664a has an interface function with the bus signal control unit 661, the outbound control unit 662, and the arbitration unit 665; and the bus fault indicator 664a is set when the bus signal control unit 661 detects a bus fault. Besides, recovery from a fault state (cancellation of a degeneracy state) is performed by resetting the bus fault indicator 664a.

The arbitration unit 665 has a control function of performing arbitration of the right of bus use with respect to a bus use request from PCI devices connected on the PCI bus 7 and the outbound buffer control unit 63. Furthermore, the arbitration unit 665 has an interface function with the bus fault indicator 664a; and has a control function of masking the bus use request from the PCI devices at the time of lighting of the bus fault indicator 664a and not accepting inbound system transactions.

The log collection unit 67 has an interface function with the PCI bus control unit (PXC) 66, and has a mechanism which collects various kinds of detailed log information on a fault occurrence section at a time of detecting a bus fault. Furthermore, the log collection unit 67 includes a log buffer 67a which is for storing the collected log information. The log collection unit 67 has a function of resetting the aforementioned bus reset inhibition indicator 664b at a time of completing collection of the log information.

Next, the function of a bridge driver will be described.

The bridge driver has various kinds of function groups for PCI bus access which are supplied to each PCI device driver. A function group will be exemplified in the following Table-1.

TABLE 1

| FUNCTION NAME | FUNCTION |
|---|---|
| pci_config_read( ) | READ OF CONFIGURATION SPACE |
| pci_config_write( ) | WRITE OF CONFIGURATION SPACE |
| pci_io_read( ) | READ OF PCI IO SPACE |
| pci_io_write( ) | WRITE (DEFERRED WRITE) OF PCI IO SPACE |
| pci_mem_read( ) | READ OF PCI MAPPED MEMORY SPACE |
| pci_mem_write( ) | WRITE (POSTED WRITE) OF PCI MAPPED MEMORY SPACE |
| pci_bus_check( ) | DEGENERACY STATE CHECK OF PCI BUS |
| pci_bus_recovery( ) | RECOVER REQUEST FROM DEGENERACY STATE OF PCI BUS |

The bridge driver has a function of sending transactions corresponding to an access request at a time of requiring PCI bus access (at a time of calling a providing function) from each PCI device driver. Furthermore, the bridge driver has a function of confirming the bus fault indicator 664a of the PCI bus controller 6 in the case of detecting read out data of ALL "1" (data in which all bits have a value of "1") at an outbound read transaction process, a function of confirming the bus fault indicator 664a of the PCI bus controller 6 at the request of the device driver, a function of periodically confirming the bus fault indicator 664a of the PCI bus controller 6, and a function of notifying an error state to each PCI device driver in the case of detecting lighting of the bus fault indicator 664a of the PCI bus controller 6. Besides, the bridge driver has a function of sending transactions which request fault recovery operation to the PCI bus controller 6 at the request of PCI bus fault recovery from each PCI device driver, and a function of notifying each PCI device driver if the fault recovery has been completed.

In order to use a fault recovery unit, it is necessary that the PCI device driver uses a bridge driver providing function group in accessing to the PCI devices and executes an appropriate fault recovery process in the case where an error state is notified from the bridge driver.

Figure 3:
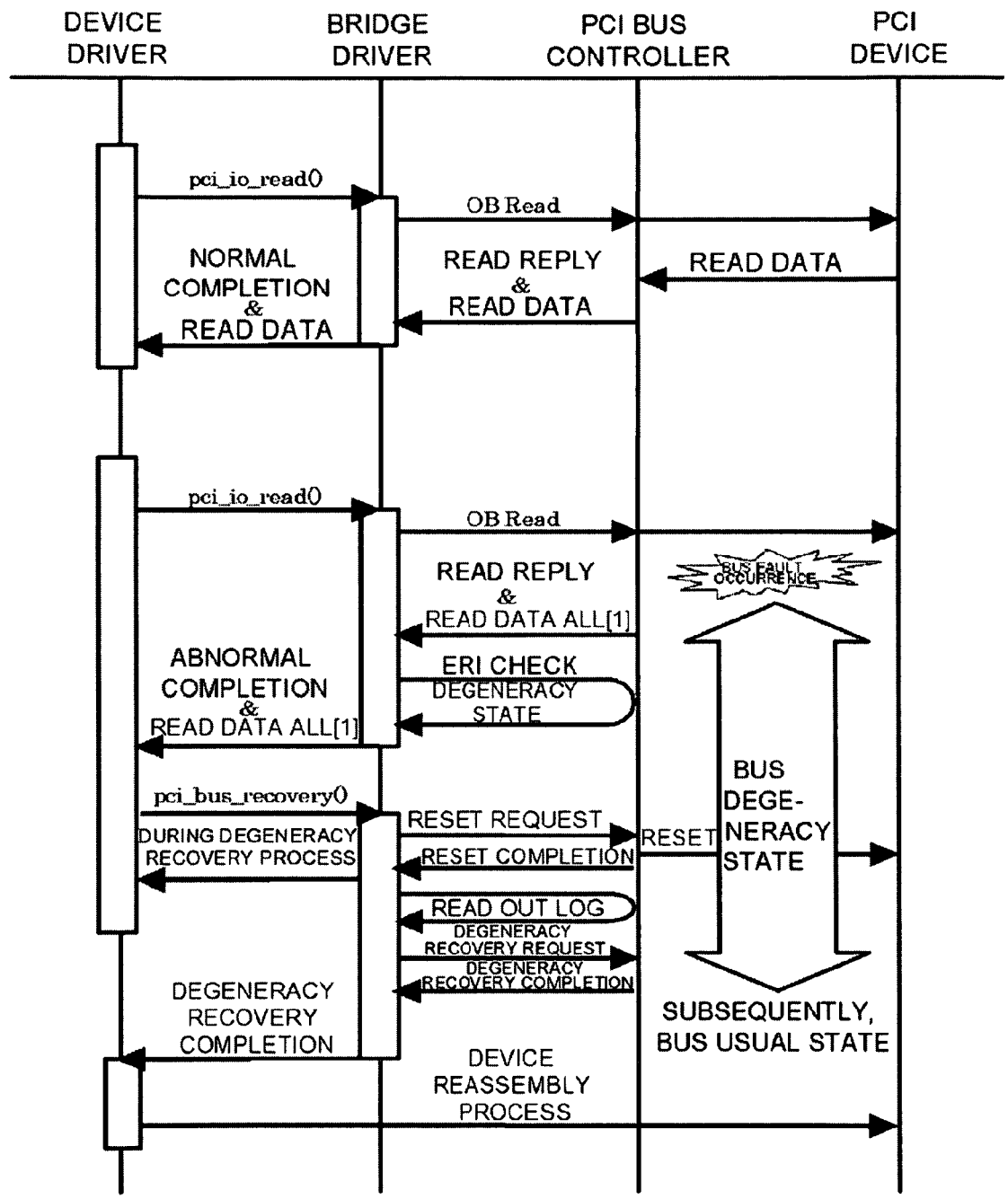
FIG. 3 is a chart showing a process flow of an I/O read.

Next, the operation of a system having the above configuration will be described with reference to FIGS. 3 to 6. A procedure for an I/O read (outbound read) from the processor 1 is as follows. FIG. 3 shows a process flow of the I/O read.

When the PCI device driver reads out data from the PCI devices, a read function (pci_io_read( ), pci_mem_read( )) which the bridge driver supplies is called. This causes the bridge driver to send an outbound read request transaction to an objective PCI device. The outbound read request transaction is sent from the memory controller 3 to the IOC via the FSB 2. The outbound read request transaction sent to the IOC is received by the input interface control unit 61 in the PCI bus controller 6. The input interface control unit 61 by which the transaction is received determines store destinations of the transactions depending on transaction types.

In this case, because of outbound system transactions, the store destination becomes the buffer 63a of the outbound buffer control unit 63. The outbound buffer control unit 63 in which the transaction is stored requests the right of use of the PCI bus 7 to the arbitration unit 665. The arbitration unit 665 which has received this performs arbitration of the PCI bus 7, and notifies use permission of the PCI bus 7 to the outbound buffer control unit 63. The outbound buffer control unit 63 which has received the notification sends the transaction stored in the buffer 63a to the outbound control unit 662.

The outbound control unit 662 has received the outbound read request transaction; therefore, the outbound control unit 662 sends the received transaction to the bus signal control unit 661. The bus signal control unit 661 converts the received transaction to a PCI bus transaction and sends it to the PCI bus 7 to reach the objective PCI device. The PCI device which has received a read request transaction (in this case, address) sends corresponding read data on the PCI bus 7. The read data is received by the bus signal control unit 661. A transfer operation of data on the PCI bus 7 is a general PCI cycle; therefore, the transfer operation is well known to those skilled in the art, and its detail will not be described.

The bus signal control unit 661 which has received the read data sends the read data to the inbound control unit 663. The inbound control unit 663 stores the received read data in the buffer 64a of the inbound buffer control unit 64. The bus signal control unit 661 which has confirmed completion of receiving data requested from the PCI device sends a normal reply to the inbound buffer control unit 64 via the inbound control unit 663.

The inbound buffer control unit 64 which has received the reply sends out read data and the reply stored in the buffer 64a to the output interface control unit 62 as a read reply transaction. The output interface control unit 62 sends out the received read reply transaction to the memory controller 3.

Subsequently, the return is made to the CPU which is the sender of the transaction via the memory controller 3 and the FSB 2 tracking a reverse path, the return is made to the bridge driver, and the read data is returned to the device driver which has called a function.

In the case where a PCI bus error (address parity error, data parity error, SERR# detection) has occurred during an outbound read transaction execution on the PCI bus 7, the bus signal control unit 661 in the PCI bus control unit 66 detects the error and makes the bus fault indicator 664a and the bus reset inhibition indicator 664b light. At the same time, the bus signal control unit 661 sends out a normal read reply transaction in which the read data is set to ALL "1" with respect to the read request transaction received from the outbound control unit 662 to the inbound control unit 663.

The inbound control unit 663 stores the received read reply transaction in the buffer 64a of the inbound buffer control unit 64. The inbound buffer control unit 64 sends out the read reply transaction stored in the buffer 64a to the output interface control unit 62. The output interface control unit 62 sends out the received read reply transaction to the memory controller 3. Subsequently, the return is made to the CPU which is the sender of the transaction via the memory controller 3 and the FSB 2 tracking a reverse path, and the return is made to the bridge driver of the issuer of the read transaction. After lighting of the bus fault indicator 664a, the PCI bus 7 becomes a degeneracy state.

Figure 4:
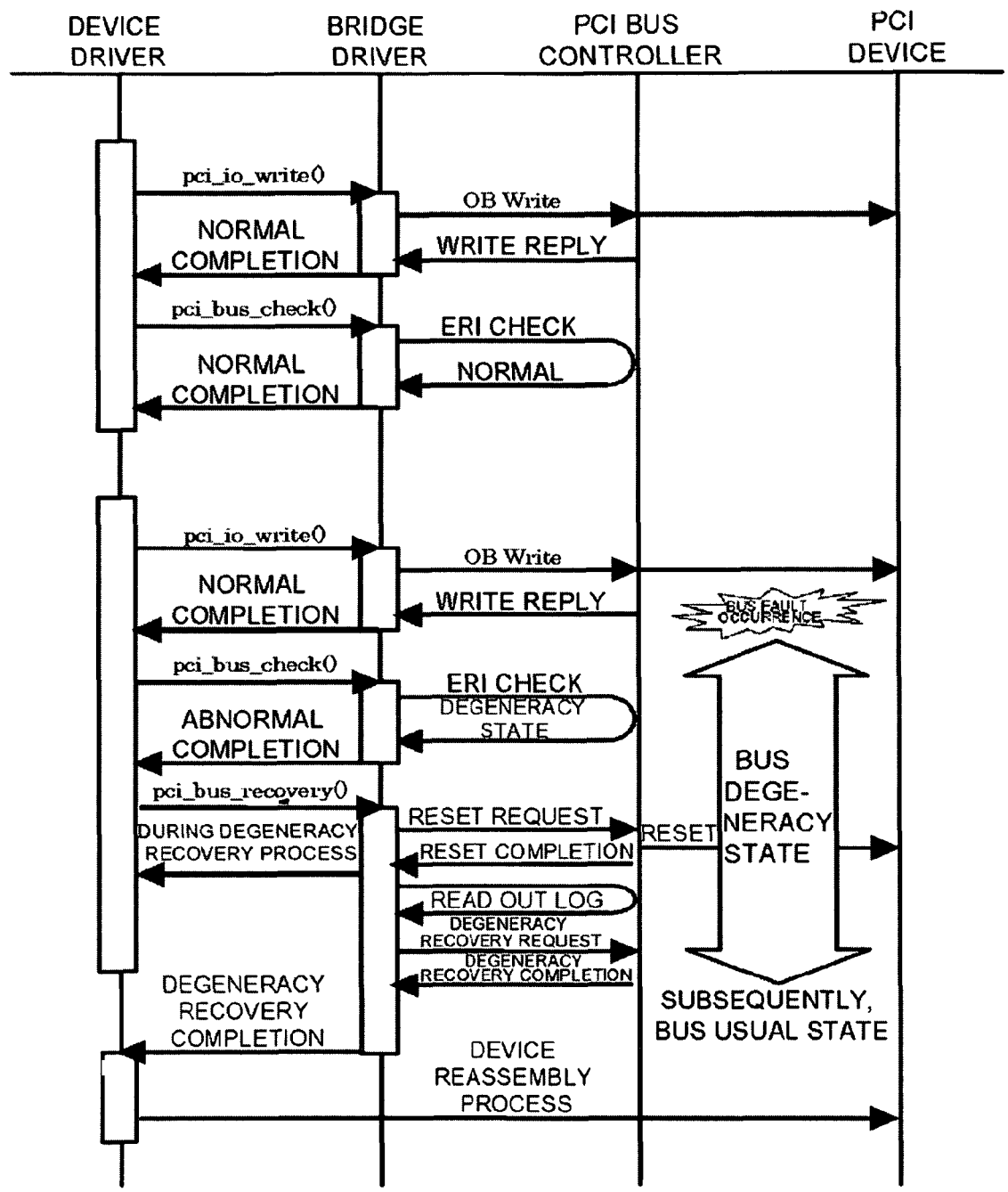
FIG. 4 is a chart showing a process flow of an I/O write.

Next, an I/O write (outbound write) from the CPU will be described. FIG. 4 is a chart showing a process flow of the I/O write.

In the case where the PCI device driver transfers data to the PCI devices, a write function (pci_io_write( ), pci_mem_write( )) which the bridge driver supplies is called. This causes the bridge driver to send an outbound write request transaction to an objective PCI device.

First, a posted write transaction (pci_mem_write( )) will be described. A posted outbound write request transaction is sent from the memory controller 3 to the IOC via the FSB 2. The outbound write request transaction sent to the IOC is received by the input interface control unit 61 in the PCI bus controller 6. The input interface control unit 61 by which the transaction is received determines store destinations of the transactions depending on transaction types. In this case, because of outbound system transactions, the store destination becomes the buffer 63a of the outbound buffer control unit 63. The outbound buffer control unit 63 in which the transaction is stored requests the right of use of the PCI bus 7 to the arbitration unit 665. The arbitration unit 665 which has received this performs arbitration of the PCI bus 7, and notifies use permission of the PCI bus 7 to the outbound buffer control unit 63. The outbound buffer control unit 63 which has received the notification sends the transaction stored in the buffer 63a to the outbound control unit 662. The outbound control unit 662 has received the outbound write request transaction; therefore, the outbound control unit 662 sends the received transaction to the bus signal control unit 661. The bus signal control unit 661 converts the received transaction to a PCI bus transaction and sends it to the PCI bus 7 to reach the objective PCI device. A transfer operation of transactions on the PCI bus 7 is a general PCI cycle; therefore, the transfer operation is well known to those skilled in the art, and its detail will not be described.

Next, description will be made about a deferred write transaction (pci_io_write( )). A transfer operation to PCI devices of a deferred outbound write request transaction is performed as in the aforementioned posted write transaction. In the case of the deferred write transaction, a reply is necessary; therefore, the bus signal control unit 661 confirms completion of sending all data to the PCI device, and then issues a normal write reply transaction to the inbound control unit 663. The inbound control unit 663 sends the write reply transaction to the inbound buffer control unit 64. The inbound buffer control unit 64 sends out the write reply transaction to the output interface control unit 62. The output interface control unit 62 sends out the received write reply transaction to the memory controller 3. Subsequently, the write reply transaction is returned to the CPU which is the sender of the transaction via the memory controller 3 and the FSB 2 tracking a reverse path.

In the case where a PCI bus error (address parity error, data parity error, SERR# detection) has occurred during an outbound write transaction execution on the PCI bus 7, the bus signal control unit 661 in the PCI bus control unit 66 detects the error and makes the bus fault indicator 664a and the bus reset inhibition indicator 664b light. At the same time, the bus signal control unit 661 discards a posted write request transaction received from the outbound control unit 662. Furthermore, a deferred write request transaction received from the outbound control unit 662 is discarded and sends out a normal write reply transaction to the inbound control unit 663. The inbound control unit 663 stores the received write reply transaction in the buffer 64a of the inbound buffer control unit 64. The inbound buffer control unit 64 sends out the write reply transaction stored in the buffer 64a to the output interface control unit 62. The output interface control unit 62 sends out the received write reply transaction to the memory controller 3. Subsequently, the write reply transaction is retuned to the CPU which is the sender of the transaction via the memory controller 3 and the FSB 2 tracking a reverse path. After lighting of the bus fault indicator 664a, the PCI bus 7 becomes a degeneracy state.

Figure 5:
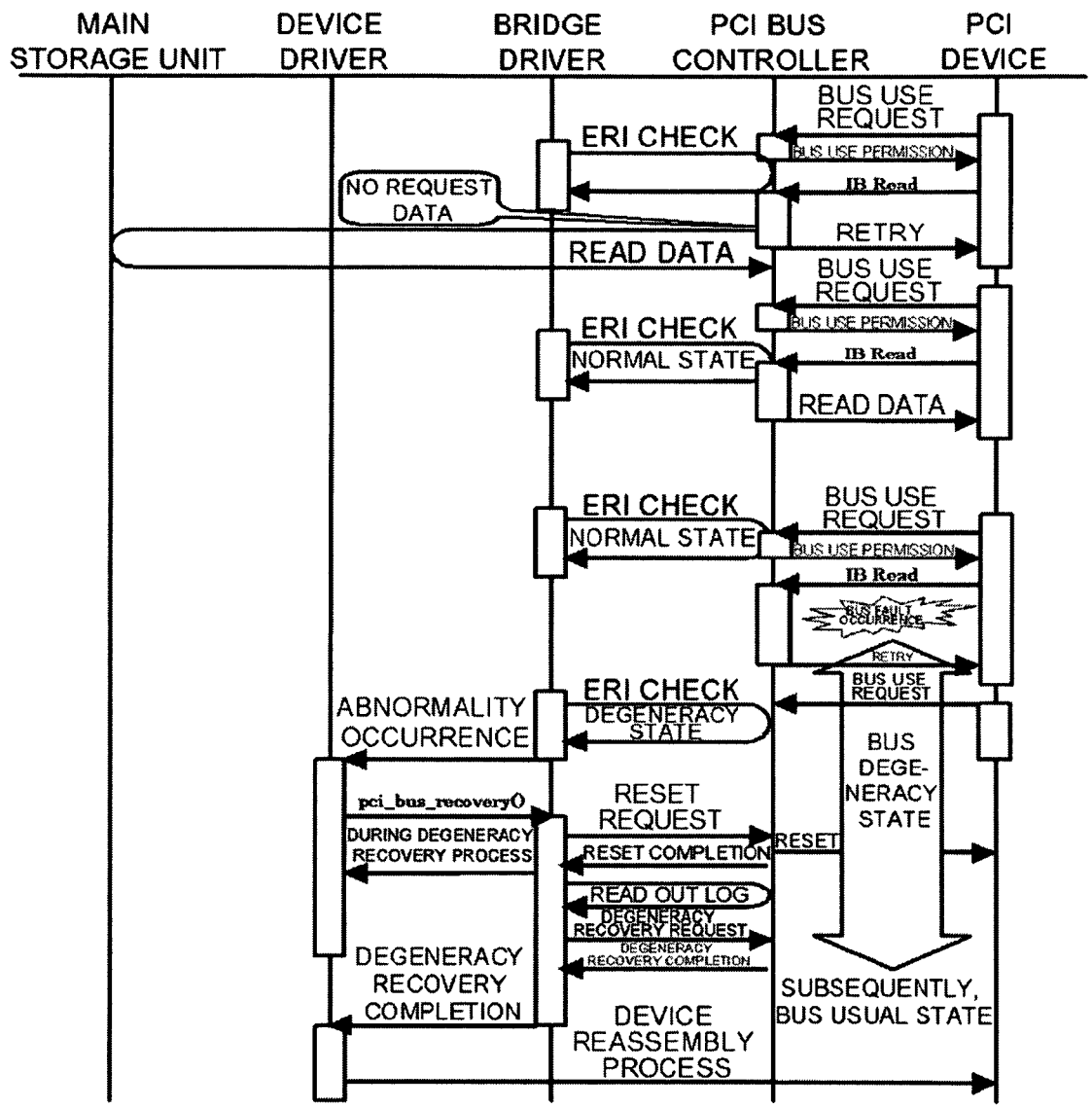
FIG. 5 is a chart showing a process flow of a memory read.

Next, a memory read (inbound read) from the PCI device will be described. FIG. 5 is a chart showing a process flow of the memory read.

The PCI devices arranged in a subordinate of the PCI bus 7 which performs the memory read drive request signal lines REQ#, and request the right of use of the PCI bus 7 to the arbitration unit 665. In response, the arbitration unit 665 performs arbitration and allows the use of the PCI bus 7 to the PCI device of the requester. The PCI device which has obtained the right of use of the PCI bus 7 sends the inbound read request transaction to the PCI bus controller 6 of the IOC. The bus signal control unit 661 which has received the read request transaction converts the received PCI transaction to an internal format in a platform and sends it to the inbound control unit (IBC) 663.

The received transaction is the inbound read request transaction; therefore, the inbound control unit 663 sends it to the inbound read data control unit 65. The inbound read data control unit 65 which has received the read request transaction checks whether or not there is read data corresponding to the read request transaction in the buffer 65a. In this case, because of a first read request transaction, there is no read data in the buffer 65a. For this reason, in order to read out data corresponding to a request transaction from the main storage unit 4, the inbound read data control unit 65 sends the read request transaction to the inbound buffer control unit 64. In parallel to this, notification is made to the bus signal control unit 661 that there is no read data. The bus signal control unit 661 which has received the notification sends instruction of a retry to the PCI device of the requester.

The inbound buffer control unit 64 which has received the read request transaction sends it to the output interface control unit 62, and the output interface control unit 62 sends the read request transaction to the memory controller 3.

The memory controller 3 accesses the main storage unit 4 in accordance with the transaction received from the IOC5. Reply data from the main storage unit 4 is sent out from the memory controller 3 to the IOC as the inbound read reply transaction tracking a reverse path, and is received by the input interface control unit 61 in the PCI bus controller 6.

The input interface control unit 61 which has received the inbound read reply transaction performs routing to the inbound read data control unit 65 because of an inbound transaction, and the inbound read data control unit 65 stores in the buffer 65a.

After that, when the bus signal control unit 661 receives the same read request transaction as the previous time from the PCI device, the read request transaction is sent to the inbound read data control unit 65 as in the above mentioned operation.

The inbound read data control unit 65 which has received the transaction checks whether or not there is read data corresponding to the buffer 65a. There is data this time; therefore, read data corresponding to the read request transaction is sent to the outbound control unit 662.

The outbound control unit 662 sends the received read data to the bus signal control unit 661. The bus signal control unit 661 converts the received read data to a PCI bus transaction and sends it to the PCI bus 7 to reach the PCI device of the read requester. A retry and a transfer operation of read data on the PCI bus 7 are well known to those skilled in the art, and their detail will not be described.

In the case where a PCI bus error (address parity error, data parity error, SERR# detection) has occurred during an inbound read transaction execution on the PCI bus 7, the bus signal control unit 661 in the PCI bus control unit 66 detects the error and makes the bus fault indicator 664a and the bus reset inhibition indicator 664b light. At the same time, the bus signal control unit 661 discards an inbound read transaction received from the PCI bus 7. After lighting of the bus fault indicator 664a, the PCI bus 7 becomes a degeneracy state.

Figure 6:
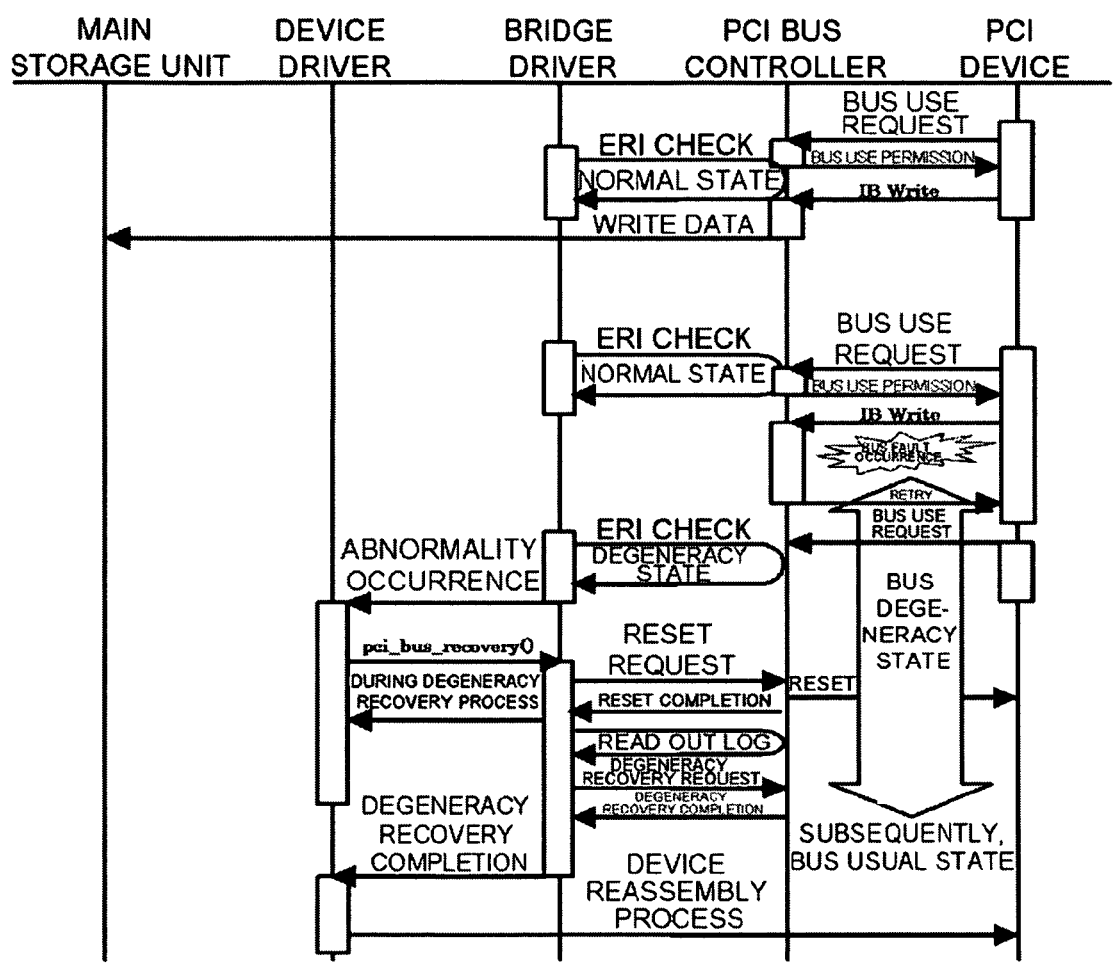
FIG. 6 is a chart showing a process flow of a memory write.

Next, a memory write (inbound write) from the PCI device will be described. FIG. 6 is a chart showing a process flow of the memory write.

The PCI devices arranged in a subordinate of the PCI bus 7 which performs the memory write drive request signal lines REQ#, and request the right of use of the PCI bus 7 to the arbitration unit 665. In response, the arbitration unit 665 performs arbitration and allows the use of the PCI bus 7 to the PCI device of the requester. The PCI device which has obtained the right of use of the PCI bus 7 sends the inbound write request transaction to the PCI bus controller 6 of the IOC 5.

The bus signal control unit 661 which has received the write request transaction converts the received PCI transaction to an internal format in a platform and sends it to the inbound control unit 663. The inbound control unit 663 sends the received write request transaction to the inbound buffer control unit 64.

The inbound buffer control unit 64 stores the received write request transaction in the buffer 64a. After the completion of receiving all write request transactions from the PCI device, the inbound buffer control unit 64 sends the transactions stored in the buffer 64a to the output interface control unit 62.

The output interface control unit 62 sends out the received write request transaction to the memory controller 3. The memory controller 3 performs writing to the main storage unit 4 in accordance with the transaction received from the IOC. A transfer operation of the write data on the PCI bus 7 is a general PCI cycle; therefore, the transfer operation is well known to those skilled in the art, and its detail will not be described.

In the case where a PCI bus error (address parity error, data parity error, SERR# detection) has occurred during an inbound write transaction execution on the PCI bus 7, the bus signal control unit 661 in the PCI bus control unit 66 detects the error and makes the bus fault indicator 664a and the bus reset inhibition indicator 664b light. The bus signal control unit 661 by which the bus fault indicator 664a is lighted discards an inbound write request transaction received from the PCI bus 7. After lighting of the bus fault indicator 664a, the PCI bus 7 becomes a degeneracy state.

Next, a transaction process in the degeneracy state will be described.

After the PCI bus controller 6 lights the bus fault indicator 664a caused by a PCI bus error, the PCI bus 7 arranged in a subordinate is dealt as the degeneracy state; and subsequent transaction will be processed in the following way.

An outbound read transaction to the PCI device is sent to the PBC 6 as in the aforementioned operation. The sent transaction reaches the outbound control unit 662 from the input interface control unit 61 via the outbound buffer control unit 63.

The outbound control unit 662 does not output the received transaction to the PCI bus 7 via the bus signal control unit 661, but converts the transaction to a normal read reply transaction in which read data is set to ALL "1" in the outbound control unit 662, and stores it in the buffer 64a of the inbound buffer control unit 64 via the inbound control unit 663.

The inbound buffer control unit 64 sends out the read reply transaction stored in the buffer 64a to the output interface control unit 62. The output interface control unit 62 sends out the received read reply transaction to the memory controller 3. Subsequently, the return is made to the CPU which is the sender of the transaction via the memory controller 3 and the FSB 2 tracking a reverse path, and the return is made to the bridge driver of the issuer of the read transaction.

Furthermore, the outbound write transaction to the PCI device is sent to the PBC 6 as in the aforementioned operation. The sent transaction reaches the outbound control unit 662 from the input interface control unit 61 via the outbound buffer control unit 63. In the case where the received transaction is a posted write, the outbound control unit 662 discards the received transaction without outputting to the PCI bus 7 via the bus signal control unit 661. Furthermore, in the case where the received transaction is a deferred write, the outbound control unit 662 discards the received transaction without outputting to the PCI bus 7 via the bus signal control unit 661, and stores a normal write reply transaction in the buffer 64a of the inbound buffer control unit 64 via the inbound control unit 663. The inbound buffer control unit 64 sends out the write reply transaction stored in the buffer 64a to the output interface control unit 62. The output interface control unit 62 sends out the received write reply transaction to the memory controller 3. Subsequently, the return is made to the CPU which is the sender of the transaction via the memory controller 3 and the FSB 2 tracking a reverse path.

Furthermore, as for an inbound transaction from the PCI device, the arbitration unit 665 masks request signal lines REQ# from the PCI devices connected to the PCI bus 7 arranged in a subordinate. This does not accept the inbound transaction and inhibits further error generation due to propagation of a PCI bus fault.

Next, a log collection process by the log collection unit 67 will be described.

After the log collection unit 67 of the PCI bus controller 6 lights the bus fault indicator 664a caused by a PCI bus error, collection of various kinds of detail log information of the PCI will be processed in the following way. The log collection unit 67 collects various kinds of detailed log information on a fault occurrence section triggered by an occurrence of the PCI bus fault. Internal register information of the PCI bus controller 6 and a hold value of a register of a PCI card mounted in a subordinate of the fault PCI bus are directed to information to be collected. As for the internal register information of the PCI bus controller 6, the log collection unit 67 has a dedicated interface (I/F) for collecting information with respect at each section, and the collection is performed using this. As for the register of the PCI card, the log collection unit 67 directly drives the bus signal control unit 661 in the PCI bus control unit 66, and collects all configuration spaces of the PCI card and a memory space (size of the memory space to be collected is optional depending on mounting) indicated by a BAR (base address register) which exists in the configuration spaces. The collected log information is stored in the log buffer 67a in the log collection unit 67. The log collection unit 67 performs a reset of the bus reset inhibition indicator 664b triggered by completion of a series of a log collection processes. In other words, the bus reset inhibition indicator 664b cancels inhibition of the reset.

Next, a fault detection process by the bridge driver will be described.

A fault detection process related to the outbound read transaction will be performed in the following way. The bridge driver checks returned read data. In this case, in the case where the received read data is ALL "1," the bridge driver detects there is a possibility that a PCI bus error has occurred. The bridge driver which has detected the possibility of the PCI bus error sends a configuration read transaction to the PCI bus controller 6, and performs confirmation of a lighting state of the bus fault indicator 664a. In this case, in the case where the bus fault indicator 664a is lighted, the bridge driver notifies a fault occurrence to the device driver. The device driver which has received the notification runs a fault recovery program itself.

A fault detection process related to the outbound write transaction will be performed in the following way. It is unknown whether the transaction has been normally completed; therefore, the device driver calls a degeneracy check function (pci_bus_check( )) in which the bridge driver provides at an appropriate timing and performs state confirmation of the PCI bus 7. This causes the bridge driver to send a configuration read transaction to the PCI bus controller 6 and to perform confirmation of a lighting state of the bus fault indicator 664a. In this case, in the case where the bus fault indicator 664a is lighted, the bridge driver notifies a fault occurrence to the device driver. The device driver which has received the notification runs a fault recovery program itself.

A fault detection process related to an inbound transaction will be performed in the following way. The inbound transaction is not sent from the PCI device during degeneracy of the PCI bus 7; therefore, there is no timing at which the device driver detects a fault. In order to detect a fault, the bridge driver periodically sends a configuration read transaction to the PCI bus controller 6 and performs confirmation of the bus fault indicator 664a. In this case, in the case where the bus fault indicator 664a is lighted, the bridge driver notifies a fault occurrence to the device driver. The device driver which has received the notification runs a fault recovery program itself.

Next, a recovery process from a degeneracy state will be described.

Recovery from a bus degeneracy state will be performed in the following way. As described above, the device driver which has been notified of a fault occurrence calls a PCI bus degeneracy state recovery request function (pci_bus_recovery( )) in the fault recovery program itself. In order to reset the PCI bus 7 in which the fault has occurred, the bridge driver which has received a recovery request sends a configuration write request transaction which requests a bus reset to the PCI bus controller 6 and notifies the device driver that the recovery is in process.

Furthermore, if the PCI bus 7 is already in recovery process, notification is made to the device driver only that the recovery is in process. The configuration write request transaction reaches the PCI bus controller 6 in the same operation as an outbound transaction. The transaction which has reached the PCI bus controller 6 is received by the input interface control unit 61 in the PCI bus controller 6.

The transaction is the configuration write request transaction; therefore, the input interface control unit 61 which has received a transaction performs routing to the outbound buffer control unit 63 and stores the transaction in the buffer 63a. The outbound buffer control unit 63 in which the transaction is stored requests the right of use of the PCI bus 7 to the arbitration unit 665. The arbitration unit 665 which has received this performs arbitration of the PCI bus 7, and notifies use permission of the PCI bus 7 to the outbound buffer control unit 63.

The outbound buffer control unit 63 which has received the notification sends the transaction stored in the buffer 63a to the outbound control unit 662. The outbound control unit 662 determines whether or not a configuration request transaction, to be sent to the PCI bus controller 6, received from the outbound buffer control unit 63 is reset instruction of the PCI bus 7. In the case where the configuration request transaction to be sent to the PCI bus controller 6 is the reset instruction of the PCI bus 7 and the bus reset inhibition indicator 664b is in a non-lighting state, the outbound control unit 662 sends out the reset instruction to the configuration unit 664; and in the case where the bus reset inhibition indicator 664b is in a lighting state, the reset instruction is kept (held) in the bus reset instruction holding unit 662a.

The bus reset instruction holding unit 662a monitors the state of the bus reset inhibition indicator 664b, operates so as to restart bus reset instruction which is kept (held) in transiting to the reset, and sends out the reset instruction to the configuration unit 664.

The configuration unit 664 performs initialization of a related section of the PCI bus 7 by driving a reset signal of the PCI bus 7 in accordance with a configuration write transaction which is the received reset instruction.

After the reset of the PCI bus 7 has been completed, the configuration unit 664 sends a configuration write reply transaction to the inbound control unit 663. The inbound control unit 663 stores the received configuration write reply transaction in the buffer 64a of the inbound buffer control unit 64.

The inbound buffer control unit 64 sends out the configuration write reply transaction stored in the buffer 64a to the output interface control unit 62. The output interface control unit 62 sends out the received configuration write reply transaction to the memory controller 3.

Subsequently, the return is made to the CPU which is the sender of the transaction via the memory controller 3 and the FSB 2 tracking a reverse path. The bridge driver which has confirmed the reset completion of the PCI bus 7 recognizes the reset completion of the PCI bus 7, reads out the log buffer 67a of the log collection unit 67, and records collected various kinds of detailed log information of the PCI as a log of the system. After that, in order to cancel the degeneracy state of the PCI bus 7, the bridge driver sends the configuration write request transaction which resets the bus fault indicator 664a to the PCI bus controller 6. The configuration write request transaction reaches the PCI bus controller 6 in the same operation as the outbound transaction.

The transaction which has reached the PCI bus controller 6 is received by the input interface control unit 61 in the PCI bus controller 6. The transaction is the configuration write request transaction; therefore, the input interface control unit 61 which has received a transaction performs routing to the outbound buffer control unit 63 and stores the transaction in the buffer 63a.

The outbound buffer control unit 63 in which the transaction is stored requests the right of use of the PCI bus 7 to the arbitration unit 665. The arbitration unit 665 which has received this performs arbitration of the PCI bus 7, and notifies use permission of the PCI bus 7 to the outbound buffer control unit 63. The outbound buffer control unit 63 which has received the notification sends the transaction which stored in the buffer 63a to the outbound control unit 662.

The outbound control unit 662 sends out the configuration request transaction, to be sent to the PCI bus controller 6, received from the outbound buffer control unit 63 to the configuration unit 664.

The configuration unit 664 performs a reset of the bus fault indicator 664a and performs recovery from the degeneracy state in accordance with the received configuration write transaction.

The configuration unit 664 sends the configuration write reply transaction to the inbound control unit 663 after resetting the bus fault indicator 664a. The inbound control unit 663 stores the received configuration write reply transaction in the buffer 64a of the inbound buffer control unit 64. The inbound buffer control unit 64 sends out the configuration write reply transaction stored in the buffer 64a to the output interface control unit 62. The output interface control unit 62 send out the received configuration write reply transaction to the memory controller 3.

Subsequently, the return is made to the CPU which is the sender of the transaction via the memory controller 3 and the FSB 2 tracking a reverse path. The bridge driver which confirmed completion of a configuration write notifies the recovery completion to the device driver which has instructed a recovery request. The device driver which has been notified of the recovery completion performs a process which is for reassembling the PCI device in the system.

Operational advantages which the computer system of the above first exemplary embodiment exhibits are as follows. As described above, even during transition to a degeneracy state due to a fault occurrence of the PCI bus 7, the log collection unit 67 directly controls the bus signal control unit 661 of the PCI bus control unit (PXC) 66, and obtains information of the PCI device mounted in a subordinate of the PCI bus 7 in which a fault has occurred. The bus reset inhibition indicator 664b is one which performs control for temporarily inhibiting (forbidding) a reset of the PCI bus 7 in a subordinate; and the bus reset inhibition indicator 664b is set triggered by an occurrence of a fault of the PCI bus 7, and is reset by completion of log information collection by the log collection unit 67. The bus reset instruction holding unit 662a is one which temporarily holds reset instruction of the PCI bus 7; and the bus reset instruction holding unit 662a keeps (holds) the PCI bus reset instruction issued to the PCI bus 7 during a period in which the bus reset inhibition indicator 664b is set (during a period in which the log collection unit 67 collects log information), and performs control so as to restart a process which is held triggered by a reset of the bus reset inhibition indicator 664b.

Furthermore, the bridge driver executes a reset process of the PCI bus 7 having a fault caused by a recovery process due to fault detection of the PCI bus 7; however, competition of a reset process of the PCI bus 7 by the bridge driver and log collection process by the log collection unit 67 is appropriately avoided by the operation of the bus reset inhibition indicator 664b, the bus reset instruction holding unit 662a, and the log collection unit 67; and secure process completion of log collection can be assured.

Furthermore, the bus fault indicator 664a is set triggered by an occurrence of a fault of the PCI bus 7, and is reset by instruction of the bridge driver. When the reset of the PCI bus 7 having a fault caused by a recovery process due to fault detection of the PCI bus 7 has been completed, the bridge driver reads out the log buffer 67a of the log collection unit 67 and records it as log information of the system. After that, the bus fault indicator 664a is reset in order to cancel a degeneracy state of the PCI bus 7. The bridge driver assures a set state of the bus fault indicator 664a during from the timing of the fault occurrence of the PCI bus 7 to the timing of the reset completion of the PCI bus 7; and accordingly a special process (all normal reply return in the case of writing process, and return of data in which all normal reply is ALL "1" in the case of reading process) with respect to a transaction to a fault PCI bus capable of being issued accidentally during a reset process period of the PCI bus 7 is assured; and lost occurrence (severe fault) of the transaction by competition of the reset and the transaction of the PCI bus 7 is avoided.

By these operations, log information (inside chipset and register information of PCI card) during the fault of tho PCI bus 7 can be securely collected, and the PCI bus reset can be safely executed. Furthermore, the special process (all normal reply return in the case of writing process, and return of data in which all normal reply is ALL "1" in the case of reading process) with respect to a transaction to a fault PCI bus capable of being issued accidentally during a reset process period of the PCI bus 7 is assured; therefore, occurrence of severe faults such as a transaction lost due to competition of the reset of the PCI bus 7 and the transaction capable of being issued accidentally can be avoided; and the recovery process from the fault of the PCI bus 7 can be safely executed.

Second Exemplary Embodiment

Figure 7:
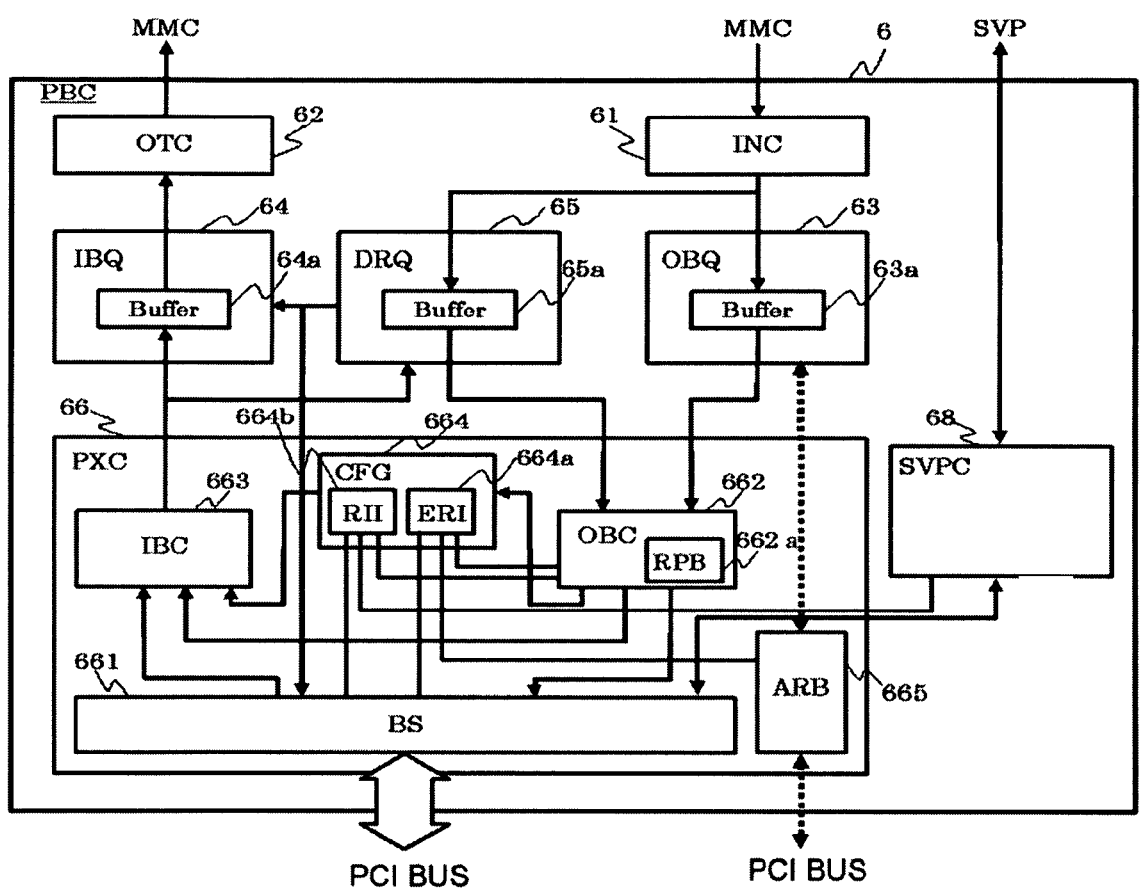
FIG. 7 is a block diagram showing a schematic configuration of a PCI bus controller (PBC) of a second exemplary embodiment according to the present invention.

Next, a second exemplary embodiment according to the present invention will be described. FIG. 7 is a block diagram showing a schematic configuration of a PCI bus controller (PBC) 6 of a second exemplary embodiment. The PCI bus controller 6 shown in FIG. 7 has the same configuration as the PCI bus controller 6 shown in FIG. 2 except for a point having a log collection unit for a service processor 68.

The service processor (SVP) is one which performs the entire process relevant to operations of the computer system, and is widely adopted in a relatively large scale computer system. Generally, the service processor (SVP) also executes a collection record process of log information at a time of a fault occurrence, and it is also possible to achieve a function related to the log collection unit 67 shown in the above exemplary embodiment by performing control of the service processor (SVP).

FIG. 7 shows one example of a PCI bus controller in the computer system in which the service processor (SVP) is introduced. A log collection unit for a service processor (SVPC) 68 shown in FIG. 7 has an interface function with a service processor, and can perform various control in a PCI bus controller 6 (reading out or writing of internal register) by instruction from the service processor (SVP).

The SVPC 68 receives a report of a fault of the PCI bus from a bus signal control unit 661 and notifies the fault occurrence to the service processor (SVP). The service processor (SVP) in which the fault occurrence of the PCI bus is notified collects various kinds of detailed log information of the PCI via the SVPC 68 and records as log information of the system. The service processor (SVP) performs a reset of a bus reset inhibition indicator 664*b* set to perform control for temporarily inhibiting (forbidding) the reset of the PCI bus via the SVPC 68, after tho completion of a series of log collection processes. The function of the log collection unit 67 shown in FIG. 2 is achieved by the function of the service processor (SVP) and the SVPC 68, and other operation is fundamentally the same as the operation of the above first exemplary embodiment. In addition, in the configuration shown in FIG. 2, there is the process in which the bridge driver reads out the log buffer 67*a* of the log collection unit 67; however, in this exemplary embodiment, the process is executed by the service processor (SVP); therefore, the process is not required as the bridge driver.

Third Exemplary Embodiment

Figure 8:
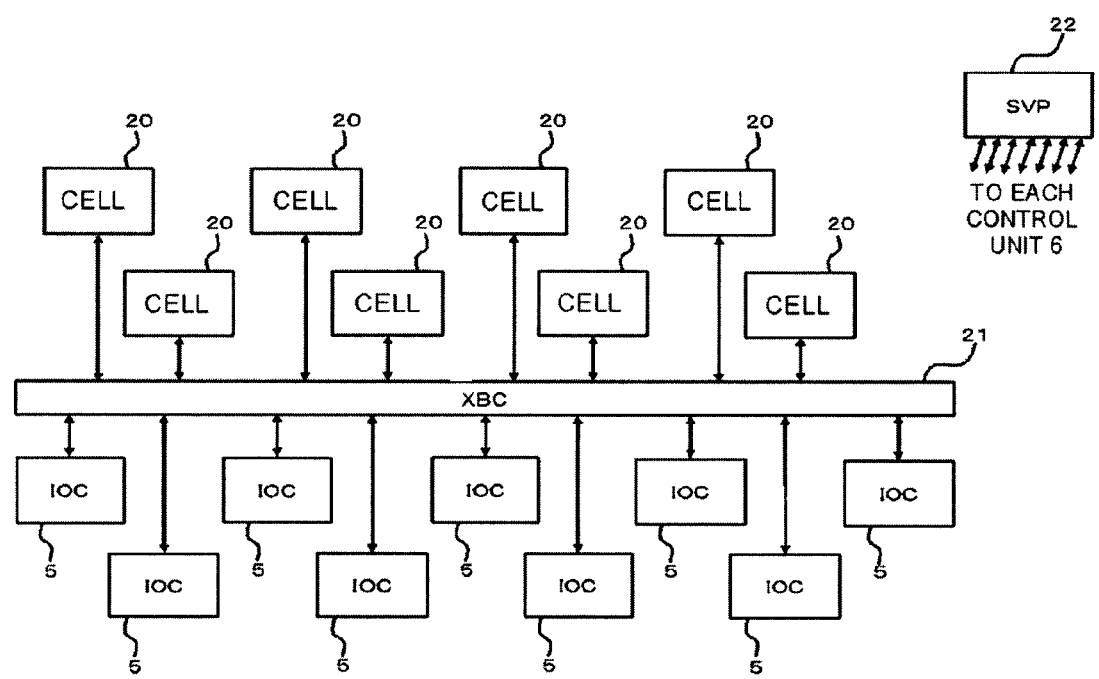
FIG. 8 is a diagram showing a configuration of a large scale system of a third exemplary embodiment according to the present invention.
Figure 9:
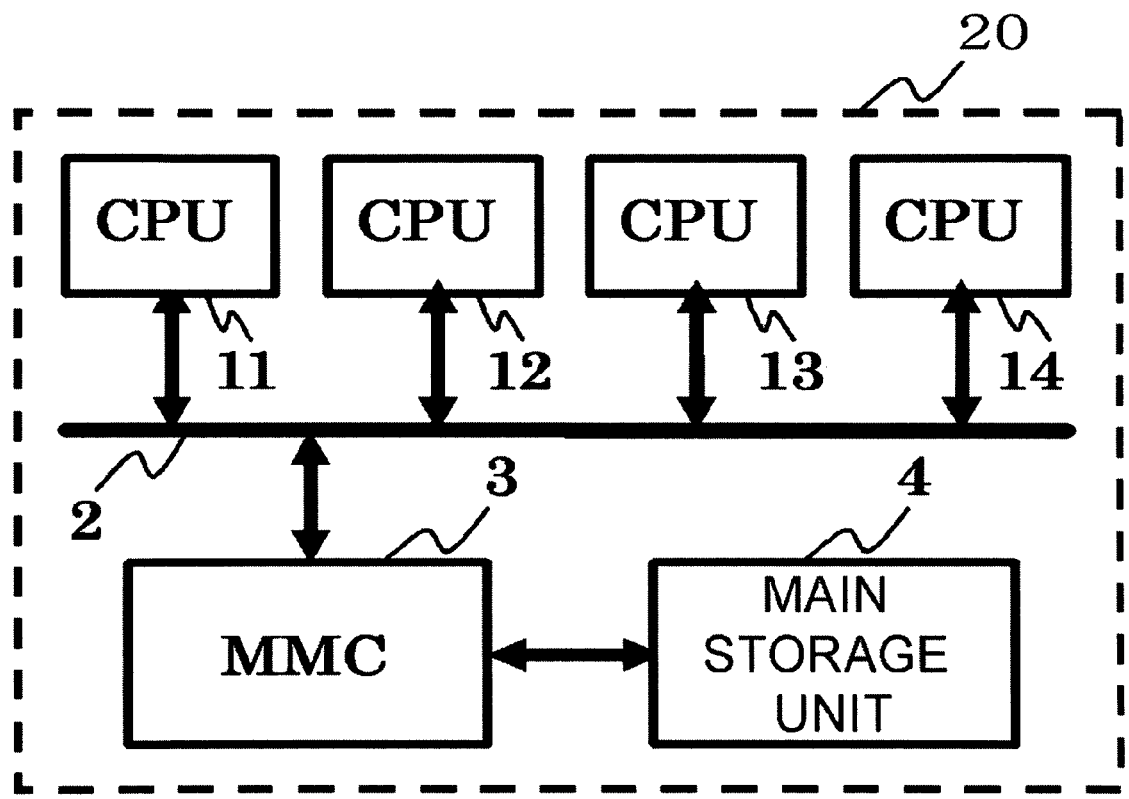
FIG. 9 is a diagram showing a configuration of a cell which constitutes the large scale system of the third exemplary embodiment.
Figure 10:
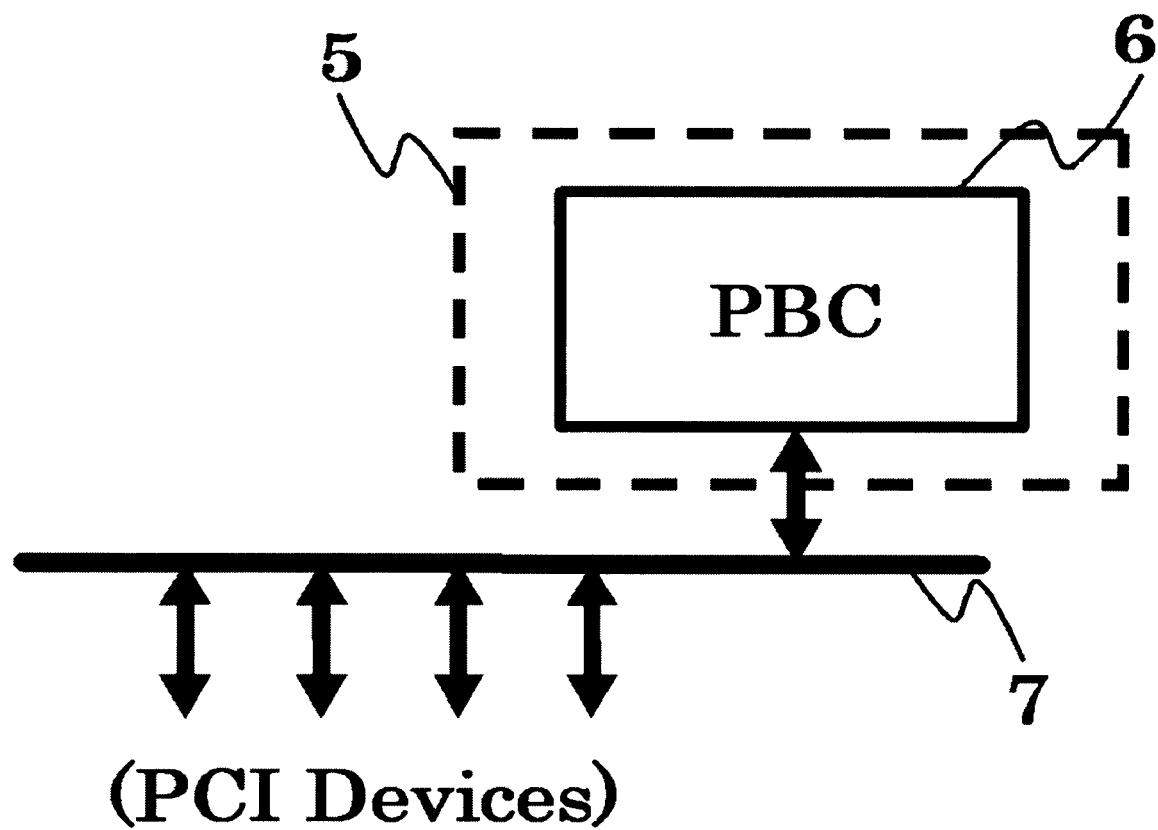
FIG. 10 is a diagram showing a configuration of an I/O controller which constitutes the large scale system of the third exemplary embodiment.

Next, a third exemplary embodiment according to the present invention will be described. FIG. 8 is a diagram showing a configuration of a large scale system of a third exemplary embodiment. The large scale system has a plurality of cells 20 . . . , a plurality of I/O controllers (IOC) 5, and a crossbar switch 21 which connects these cells 20, . . . and the I/O controllers 5. FIG. 9 is a diagram showing a configuration of the cell 20, and FIG. 10 is a diagram showing a configuration of the I/O controller 5. The configuration shown in FIG. 10 is substantially the same as the configuration of the I/O controller 5 shown in FIG. 1.

As shown in FIG. 9, each cell 20 has processors (CPU) 11 to 14, a processor bus 2, a memory controller 3, and a main storage unit 4 as constitutional units. The large scale system (multiprocessor system) shown in FIG. 8 is constructed by increasing the number of the processors 1 shown in FIG. 2, by consolidating the interface (I/F) function of the memory controller 3 and the I/O controller 5 shown in FIG. 2 to the crossbar switch (XBC) 21, and by increasing the number of the I/O controllers 5 and the PCI buses. The system using such crossbar switch 21 is a technique widely known by hose skilled in the art; therefore, their detail will not be described in this case.

The large scale system is a 32 way processor machine constituted by 8 cells. Even in such large scale multiprocessor system, the operation of an I/O read from the CPU, an I/O write from the CPU, a memory read from the PCI device, and a memory write from the PCI device is performed by sending and receiving of transactions such as the outbound read, the outbound write, the inbound read, and the inbound write as described above. In the large scale system, the crossbar switch (XBC) 21 is added as the constitutional element; however, various transactions are performed only via the crossbar switch 21.

Therefore, in the third exemplary embodiment, the same effects as in the aforementioned first exemplary embodiment can be brought out without depending on configuration scale of the multiprocessor system.

As described above, the exemplary embodiments of the present invention are described with reference to the drawings; however, these are exemplification of the present invention and various configurations other than the above mention can be adopted. For example, in the above exemplary embodiments, buses and devices conforming to the PCI standard are used, respectively, as the input and output buses and the input and output devices; however, the present invention is not limited to those. The present invention can be applied to any standard so long as a fault can occur in signal transmission paths.

It is apparent that the present invention is not limited to the above embodiments, and may be modified and changed without departing from the scope and spirit of the invention.

What is claimed is:

1. A computer system comprising:
a processor which performs data processing;
an input and output bus to which at least one input and output device is connected; and
a bus control device which is intervened between said processor and said input and output bus, and performs control of the operation of said input and output bus;
wherein said bus control device includes:
a reset control unit which resets said input and output bus in response to receipt of reset instruction;
a reset inhibition unit which inhibits a reset of said input and output bus triggered by a fault occurrence in said input and output bus;
a log collection unit which collects log information of an input and output device connected to a fault occurrence section in said input and output bus triggered by the fault occurrence in said input and output bus, the log information including internal register information of said bus control device and a hold value of the input and output device; and
an input and output interface which transfers the log information collected by said log collection unit to said processor;
wherein said reset inhibition unit cancels inhibition of the reset after the collection of the log information by said log collection unit has been completed.

2. The computer system as set forth in claim 1,
wherein said bus control device further includes a bus fault indicator which makes said input and output bus transit to a degeneracy state triggered by the fault occurrence in said input and output bus, and
said bus fault indicator cancels the degeneracy state of said input and output bus after the reset of said input and output bus by said reset control unit has been completed.

3. The computer system as set forth in claim 2,
wherein said processor has a bridge driver which instructs transition to the degeneracy state of said input and output bus to said bus fault indicator triggered by the fault occurrence in said input and output bus, and
said bridge driver instructs cancellation of the degeneracy state of said input and output bus to said bus fault indicator after the reset of said input and output bus by said reset control unit has been completed.

4. The computer system as set forth in claim 1,
wherein said bus control device further includes a reset instruction holding unit which holds the reset instruction till inhibition of the reset is canceled by said reset inhibition unit; and
said reset instruction holding unit sends the held reset instruction to said reset control unit after the inhibition of the reset has been canceled.

5. The computer system as set forth in claim 4,
wherein said processor issues a transaction representing the reset instruction triggered by the fault occurrence in said input and output bus.

6. The computer system as set forth in claim 1,
wherein said log collection unit has a log buffer which temporarily stores the collected log information; and
said input and output interface reads out the log information from said log buffer and transfers the log information to said processor after the reset of said input and output bus by said reset control unit has been completed.

7. The computer system as set forth in claim 1,
wherein said bus control device includes a register which holds data representing a control state with respect to the operation of said input and output bus; and
said log collection unit collects data representing the control state from said register as log information, and said input and output interface transfers the log information to said processor.

8. The computer system as set forth in claim 1,
wherein said input and output bus is a PCI (Peripheral Component Interconnect) bus.

9. The computer system according to claim 1, wherein
said bus control device further includes a bus fault indicator that makes said input and output bus transit to a degeneracy state triggered by the fault occurrence in said input and output bus, and
said log collection unit collects the hold value of the input and output device connected to the fault occurrence section even during the degeneracy state of said input and output bus.

10. A bus control device which intervenes between a processor which performs data processing and an input and output bus to which at least one input and output device is connected, and performs control of the operation of said input and output bus, said bus control device comprising:
a reset control unit which resets said input and output bus in response to receipt of reset instruction;
a reset inhibition unit which inhibits a reset of said input and output bus triggered by a fault occurrence in said input and output bus;
a log collection unit which collects log information of an input and output device connected to a fault occurrence section in said input and output bus triggered by the fault occurrence in said input and output bus, the log information including internal register information of said bus control device and a hold value of the input and output device; and
an input and output interface which transfers the log information collected by said log collection unit to said processor;
wherein said reset inhibition unit cancels inhibition of the reset after the collection of the log information by said log collection unit has been completed.

11. The bus control device as set forth in claim 10,
further comprising a bus fault indicator which makes said input and output bus transit to a degeneracy state triggered by the fault occurrence in said input and output bus; and
said bus fault indicator cancels the degeneracy state of said input and output bus after the reset of said input and output bus by said reset control unit has been completed.

12. The bus control device as set forth in claim 10,
further comprising a reset instruction holding unit which holds the reset instruction till inhibition of the reset is canceled by said reset inhibition unit; and
said reset instruction holding unit sends the held reset instruction to said reset control unit after the inhibition of the reset has been canceled.

13. The bus control device as set forth in claim 10,
wherein said log collection unit has a log buffer which temporarily stores the collected log information; and
wherein said input and output interface reads out the log information from said log buffer and transfers the log information to said processor after the reset of said input and output bus by said reset control unit has been completed.

14. The bus control device as set forth in claim 10,
further comprising a register which holds data representing a control state with respect to the operation of said input and output bus; and
wherein said log collection unit collects data representing the control state from said register as log information, and said input and output interface transfers the log information to said processor.

15. The bus control device as set forth in claim 10,
wherein said input and output bus is a PCI (Peripheral Component Interconnect) bus.

16. A computer system comprising:
a processor which performs data processing;
an input and output bus to which at least one input and output device is connected; and
a bus control device which is intervened between said processor and said input and output bus, and performs control of the operation of said input and output bus;
wherein said bus control device includes:
a reset control means for resetting said input and output bus in response to receipt of reset instruction;
a reset inhibition means for inhibiting a reset of said input and output bus triggered by a fault occurrence in said input and output bus;
a log collection means for collecting log information of an input and output device connected to a fault occurrence section in said input and output bus triggered by the fault occurrence in said input and output bus, the log information including internal register information of said bus control device and a hold value of the input and output device; and
an input and output interface which transfers the log information collected by said log collection means to said processor;
wherein said reset inhibition means cancel inhibition of the reset after the collection of the log information by said log collection means has been completed.

17. A bus control device which intervenes between a processor which performs data processing and an input and output bus to which at least one input and output device is connected, and performs control of the operation of said input and output bus, said bus control device comprising:
a reset control means for resetting said input and output bus in response to receipt of reset instruction;
a reset inhibition means for inhibiting a reset of said input and output bus triggered by a fault occurrence in said input and output bus;
a log collection means for collecting log information of an input and output device connected to a fault occurrence section in said input and output bus triggered by the fault occurrence in said input and output bus, the log information including internal register information of said bus control device and a hold value of the input and output device; and
an input and output interface which transfers the log information collected by said log collection means to said processor;
wherein said reset inhibition means cancel inhibition of the reset after the collection of the log information by said log collection means has been completed.

18. A bus control method of controlling of the operation of an input and output bus to which at least one input and output device is connected, said bus control method comprising:
resetting said input and output bus in response to receipt of reset instruction;
inhibiting a reset of said input and output bus triggered by a fault occurrence in said input and output bus;

collecting log information of an input and output device connected to a fault occurrence section in said input and output bus triggered by the fault occurrence in said input and output bus, the log information including internal register information of said bus control device and a hold value of the input and output device;

transferring the log information collected to a processor which performs data processing; and canceling the inhibition of the reset after the collection of the log information has been completed.

* * * * *